(12) United States Patent
Poulton et al.

(10) Patent No.: US 12,237,878 B2
(45) Date of Patent: Feb. 25, 2025

(54) SIGNALING OVER RC-DOMINATED TRANSMISSION LINES

(71) Applicant: NVIDIA Corporation, Santa Clara, CA (US)

(72) Inventors: John Poulton, Durham, NC (US);
Sanquan Song, Santa Clara, CA (US);
Xi Chen, Santa Clara, CA (US);
Walker Turner, Durham, NC (US);
Yoshinori Nishi, Santa Clara, CA (US);
John M. Wilson, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 18/086,351

(22) Filed: Dec. 21, 2022

(65) Prior Publication Data

US 2024/0214028 A1 Jun. 27, 2024

(51) Int. Cl.
*H04B 3/04* (2006.01)
(52) U.S. Cl.
CPC ...................................... *H04B 3/04* (2013.01)
(58) Field of Classification Search
CPC ........................................................ H04B 3/04
USPC .......................................... 375/229–230, 222
See application file for complete search history.

(56) References Cited

U.S. PATENT DOCUMENTS

| | | | |
|---|---|---|---|
| 7,778,323 B1* | 8/2010 | Nodenot | H04L 25/03038 375/233 |
| 11,398,934 B1* | 7/2022 | Casey | H04L 25/4917 |
| 11,499,997 B2* | 11/2022 | Eaves | H02H 3/05 |
| 2001/0013803 A1* | 8/2001 | Bertin | H04L 25/0278 327/328 |
| 2005/0013355 A1* | 1/2005 | Smith | H04B 17/18 375/224 |
| 2008/0123771 A1* | 5/2008 | Cranford | H04L 25/0278 333/17.3 |
| 2008/0317164 A1* | 12/2008 | Satou | H04L 25/029 375/295 |
| 2011/0074391 A1* | 3/2011 | Bartlett | G01R 1/06766 324/76.44 |
| 2012/0309456 A1* | 12/2012 | Yamamoto | H04N 23/57 327/108 |

(Continued)

FOREIGN PATENT DOCUMENTS

WO WO-2013107968 A2 * 7/2013 ............ B60L 53/14

OTHER PUBLICATIONS

Weber, Joe, "Oscilloscope Probe Circuits," Tektronix Circuit Concepts, Nov. 1969, pp. 1-113, Tektronix, Inc.

(Continued)

*Primary Examiner* — Emmanuel Bayard

(57) ABSTRACT

The disclosure provides a signaling link that overcomes or at least reduces the limitations of RC-dominated signaling wires, improving both the bandwidth and the power consumption of signaling circuits. Both an AC and a DC signaling link are disclosed. In one example, a signaling link is provided that includes: (1) a transmitter including a passive equalizer, (2) an over-terminated receiver, and (3) a lossy channel having a first end connected to the passive equalizer and a second end connected to the receiver, wherein the lossy channel has a channel characteristic impedance that is lower than a terminating impedance of the passive equalizer and a termination impedance of the receiver.

24 Claims, 5 Drawing Sheets

(56) References Cited

U.S. PATENT DOCUMENTS

| | | | | |
|---|---|---|---|---|
| 2014/0253208 A1* | 9/2014 | Ruberg | ............... | H04L 25/028 327/331 |
| 2014/0314136 A1* | 10/2014 | Song | ...................... | H04L 27/01 375/230 |
| 2015/0071333 A1* | 3/2015 | Zhou | ................ | H04L 25/03343 375/219 |
| 2015/0180582 A1* | 6/2015 | Zhou | .................... | H04B 10/564 398/202 |
| 2015/0271914 A1* | 9/2015 | Lai | ........................ | H01L 23/645 361/767 |
| 2016/0294585 A1* | 10/2016 | Rahman | ............ | H04L 25/03885 |
| 2017/0005784 A1* | 1/2017 | Miura | .................... | H04L 25/02 |
| 2020/0099117 A1* | 3/2020 | Lujan | .................. | H03F 3/45475 |
| 2023/0053450 A1* | 2/2023 | Eaves | ................... | G01R 31/58 |

OTHER PUBLICATIONS

Ford, Doug, "The Secret World of Oscilloscope Probes," Silicon Chip, Oct. 2009, pp. 16-23, www.siliconchip.com.au.

* cited by examiner

SIGNALING OVER RC-DOMINATED TRANSMISSION LINES

TECHNICAL FIELD

This application is directed, in general, to signaling connections, and in particular, RC-dominated circuit connections.

BACKGROUND

Communicating between circuits, whether on the same chip or on different chips, can be limited due to characteristics of the "channel", which is the electrical connection between communicating circuits. For example, short reach chip-to-chip signaling over interposer wiring is hindered by the bandwidth restrictions of RC-dominated interposer metal wires. Not only is bandwidth per pin reduced by the losses in the wires, but energy per bit is dominated by the need to charge the wires through their own resistance. One type of interposer short reach links is High-Bandwidth Memory (HBM), which attempts to overcome the interposer channel's short-comings by driving full-swing signals into an un-terminated channel. Unfortunately the result is a low-bandwidth, energy inefficient signaling system.

SUMMARY

In one aspect, the disclosure provides a signaling link. In one example the signaling link includes: (1) a transmitter including a passive equalizer, (2) an over-terminated receiver, and (3) a lossy channel having a first end connected to the passive equalizer and a second end connected to the receiver, wherein the lossy channel has a channel characteristic impedance that is lower than a terminating impedance of the passive equalizer and a termination impedance of the receiver.

In another aspect the disclosure provides an electrical system. In one example the electrical system includes: (1) a signaling link, (2) a first circuit connected to a first end of the signaling link, and (3) a second circuit connected to a second end of the signaling link, wherein the signaling link includes a transmitter having a passive equalizer network, an over-terminated receiver, and a lossy channel having a first end connected to the passive equalizer network and a second end connected to the receiver, wherein the lossy channel has a channel characteristic impedance that is lower than terminating impedances of the passive equalizer network and the receiver.

In yet another aspect, the disclosure provides a multi-chip module. In one example the multi-chip module includes: (1) multiple chips and (2) a connector that couples one or more of the multiple chips to at least a different one of the one or more of the multiple chips, wherein the connector includes one or more signaling links and at least one of the one or more signaling links includes a transmitter having a passive equalizer, an over-terminated receiver, and a lossy channel having a first end connected to the passive equalizer and a second end connected to the receiver, wherein the lossy channel has a channel characteristic impedance that is lower than terminating impedances of the passive equalizer and the receiver.

In still yet another aspect, the disclosure provides a high bandwidth memory system. In one example, the high bandwidth memory system includes: (1) one or more memories, (2) one or more circuits, and (3) a connector that connects at least one of the one or more memories to at least one of the one or more circuits, wherein the connector includes at least one signaling link that includes a transmitter including a passive equalizer, an over-terminated receiver, and a lossy channel having a first end connected to the passive equalizer and a second end connected to the receiver, wherein the lossy channel has a channel characteristic impedance that is lower than a terminating impedance of the passive equalizer and a termination impedance of the receiver.

The disclosure also provides an AC signaling link. In one example, the AC signaling link includes: (1) a transmitter including one or more equalizing capacitors, (2) an over-terminated receiver having an amplifier connected to a resistive terminator and at least one overall feedback resistor connected in parallel with the resistive terminator and the amplifier, and (3) a lossy channel having a first end connected to the one or more equalizing capacitors and a second end connected to the receiver, wherein the lossy channel has a channel characteristic impedance that is lower than a terminating impedance of the one or more equalizing capacitors and a termination impedance of the receiver.

BRIEF DESCRIPTION

Reference is now made to the following descriptions taken in conjunction with the accompanying drawings, in which.

Figure 4:
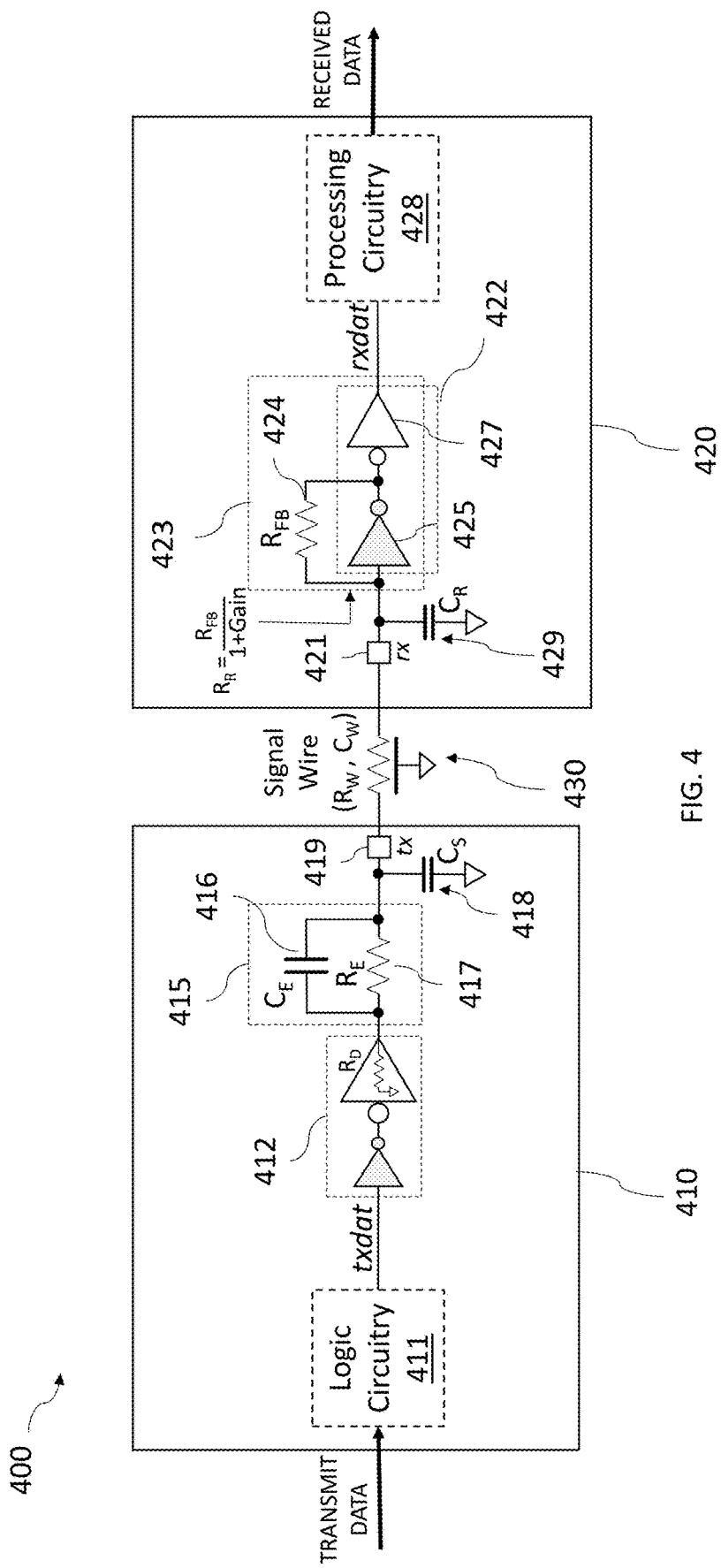
Figure 5:
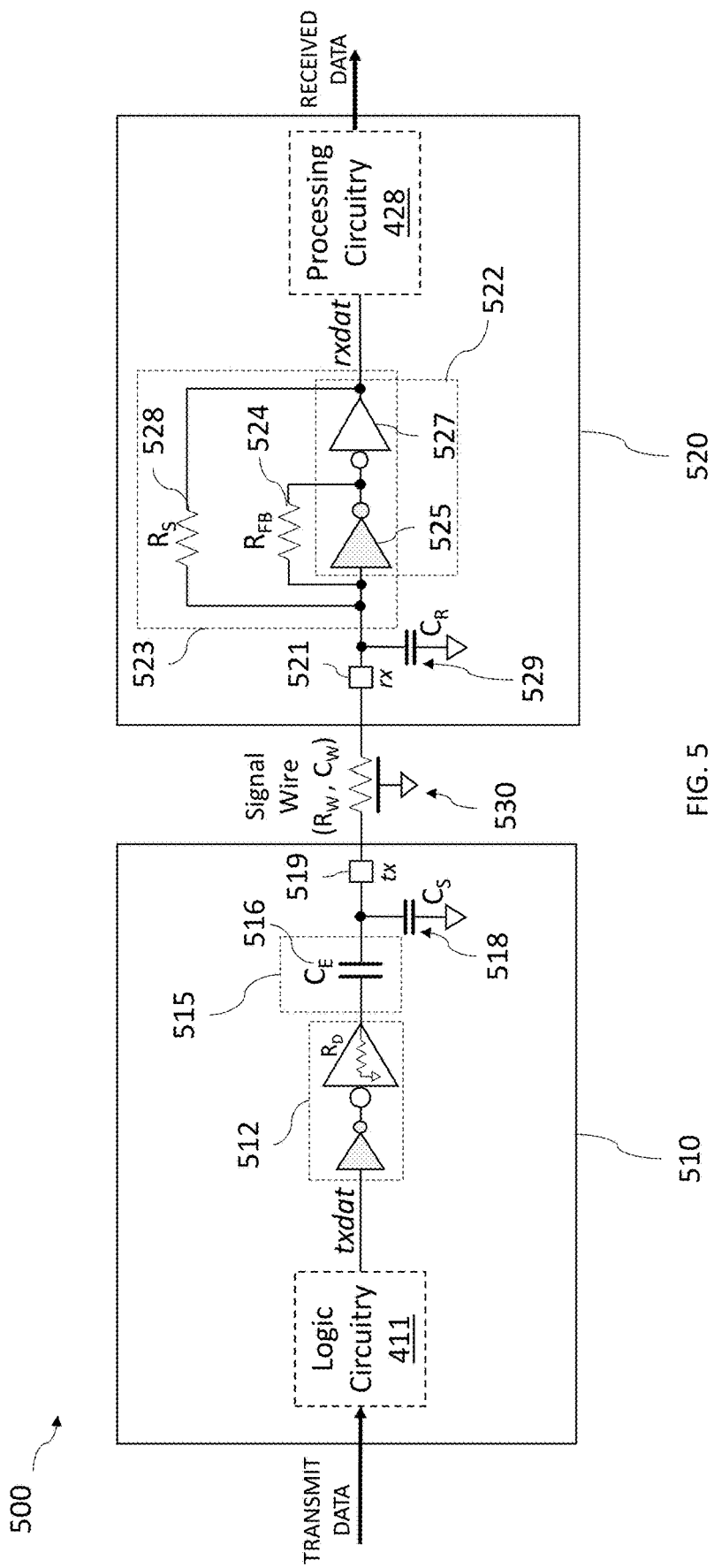

FIGS. 3A 3B, 3C, 3D, and 3E illustrate various examples of resistive terminations and amplification circuits that can be used in the receivers of the signaling links disclosed herein;

FIG. 4 illustrates a schematic diagram of an example of a DC coupled signaling link constructed according to the principles of the disclosure; and FIG. 5 illustrates a schematic of an example of an AC coupled signaling link constructed according to the principles of the disclosure.

DETAILED DESCRIPTION

RC-dominated communication channels are ubiquitous in computing systems, including chip-to-chip signaling systems whose channels are implemented on silicon interposers or other proprietary packaging technologies and on-chip signaling systems, such as fabric-style interconnects. In a RC-dominated channel, the series resistance is large enough that resistive losses cannot be ignored. Specifically, if r and l are the resistance and inductance of a wire per unit length, then the frequency at which the inductive reactance is equal to the resistance is $Fx=r/2\pi l$. When Fx is greater than the Nyquist frequency of the signals on the channel, the channel can be said to be RC-dominated.

For these RC-dominated channels, the bandwidth varies as $1/L^2$, where L is the length of the channel. As such, this phenomenon severely limits the bandwidth of RC-dominated connections that often result in unacceptable area requirements and power costs.

This disclosure provides a signaling system that overcomes or at least reduces the limitations of RC-dominated signaling wires, improving both the bandwidth and the power consumption of the signaling circuits. Power consumption in signaling systems includes static power, energy dissipated in the usually resistive termination impedances of a channel, and dynamic power, energy required to charge and discharge the capacitance of the channel. The disclosed signaling system, referred to as a signaling link, includes a transmitter having a driver, a receiver having a termination, and a lossy channel connecting the transmitter to the receiver. The lossy channel can be an RC dominated communications channel having an attenuation that reduces reflections on the channel to a negligible signal voltage. The signaling link takes advantage of the counter-intuitive idea that lossy wires can actually be advantageous for reducing voltage swing thereby reducing dynamic and static power. Additionally, bandwidth through the lossy channel can be increased using a passive equalizer integrated with the transmitter. A passive equalizer requires that the overall signaling link, including the transmitter driver, the passive equalizer, the channel itself, and the receiver termination, introduce signal attenuation, and that the passive equalizer is designed so as to make this signal attenuation constant or approximately constant across the signaling link's bandwidth. As such, a lossy channel that is equalized and attenuating is provided. The signaling link of this disclosure also features driving and termination impedances that are deliberately set higher than the characteristic impedance of the lossy channel. Channels terminated in this way are described as over-terminated. The attenuating, equalized channel reduces voltage swing on the channel, thereby directly reducing active (dynamic) signaling power. The high impedance terminations directly reduce static power in the channel. An attenuating channel allows an entirely passive equalizer, which compensates for the frequency-dependent loss in the channel, including the distributed RC-dominated channel wire itself, and the unavoidable shunt capacitances at the driving and receiving terminals of the channel. The lossy channel attenuates signal reflections generated at the purposely over-terminated receiver, and at the transmitter passive equalizer, thereby avoiding the interference between reflections and transmitted signal. For example, a lossy channel can have an attenuation of about 3 dB or greater at the Nyquist frequency. A channel with 3 dB attenuation reduces reflections at the receiver, due to receiver impedance mismatch, by about 6 db, since the reflection must pass through the channel twice before reappearing at the receiver input.

The passive equalizer may comprise a simple parallel combination of a resistor and capacitor. The resistor, in combination with the channel resistance and the receiver termination resistor, sets the "DC" (low-frequency) attenuation on the channel. One or more resistor may be used in combination for the equalizing resistor. The capacitor is sized so as to charge the channel capacitances to the attenuated signal voltage on each signal transition. The equalizing capacitor is therefore sized roughly equal to the sum of the channel and shunt capacitances times the attenuation. One or more capacitor may be used in combination for the equalizing capacitor. A value for the equalizing capacitor can be calculated from Equation 1, described in connection with FIG. 4, which is based on Sakurai's well-known analysis of rise time and delay on a wire of a typical CMOS chip. FIG. 4 illustrates an example of a passive equalizer including a parallel combination of a resistor and a capacitor. FIG. 5 illustrates an example of a passive equalizer that does not include a resistor.

Figure 1:
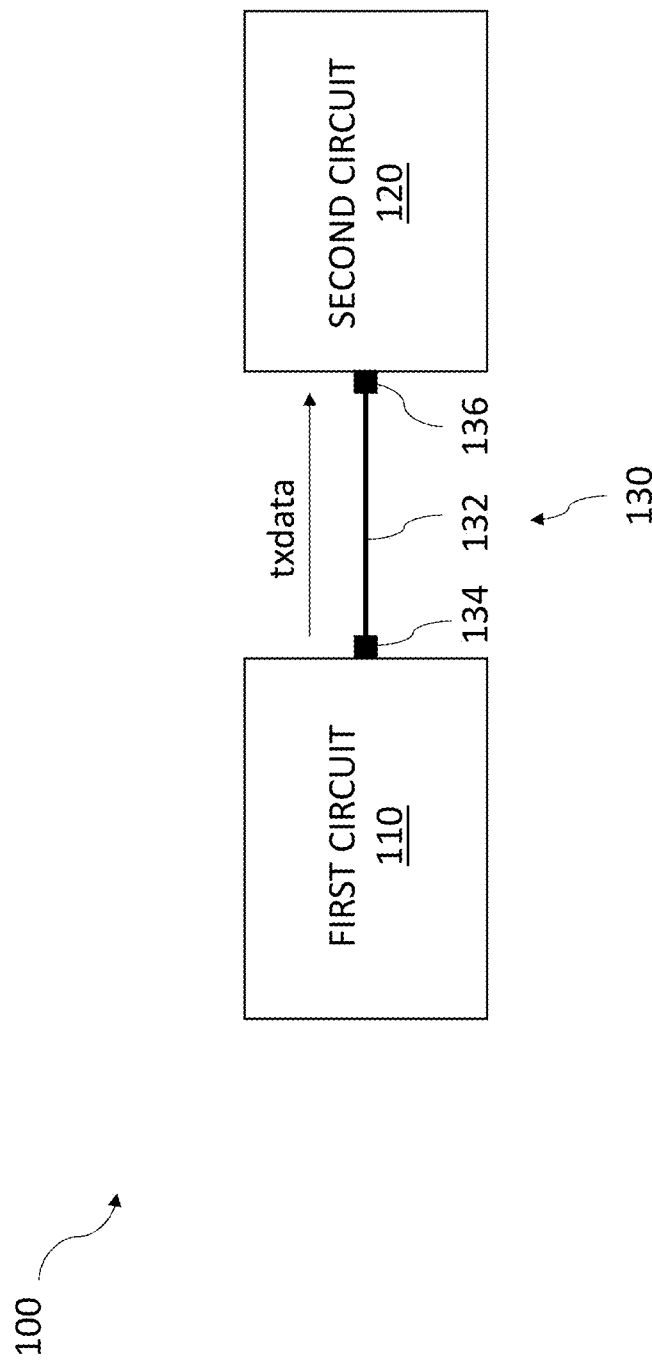
FIG. 1 illustrates a block diagram of an example of an electrical system constructed according to the principles of the disclosure.

FIG. 1 illustrates a block diagram of an example of an electrical system 100 constructed according to the principles of the disclosure. The electrical system 100 includes a first circuit 110, a second circuit 120, and a signaling link 130 that connects the first circuit 110 to the second circuit 120. Signaling link 130 includes lossy channel 132.

The first circuit and second circuits 110, 120, represent various electrical circuits that can be connected with signaling link 130. For example, the electrical system 100 can be an on-chip signaling system, a chip-to-chip signaling system on a silicon interposer, where interposer wiring comprises one or more of signaling link 130, or a chip-to-chip signaling system that uses proprietary technologies, such as embedded multi-die interconnect bridge (EMIB) from Intel® of Santa Clara, California. Fan-out packaging (FOP) is another example of an applicable signaling system. The electrical system 100 can be a HBM system, wherein an improved version of an HBM interconnect is used that replaces unterminated full-swing signaling with passively equalized low-swing signaling. Accordingly, the first circuit 110 can be a processor and the second circuit 120 can be a memory. Additionally, the first circuit 110 can be a processor and the second circuit 120 can be a different processor. The first and second circuits 110, 120, can be different types of processors or the same type of processors. For example, both first and second circuits 110, 120, can be a GPU, both can be a CPU, or one of the first and second circuits 110, 120, can be a CPU and the other one a GPU. Both the first circuit 110 and the second circuit 120 can be located on a single chip. Accordingly, electrical system 100 can be a single chip that at least includes first and second circuits 110, 120, and signaling link 130. The lossy channel 132 of the signaling link 130, such as when on a single chip, can be constructed of a metal that is not copper.

The first and second circuits 110, 120, can be two different chips that are communicatively connected via an interposer that includes at least one of signaling link 130. The interposer can be a die-to-die short reach link over interposer wiring ("ISR"). Such a system could be used, for example, to connect a GPU to a set of electro-optical converters, to connect multiple GPU or CPU chiplets together to form a larger processor, or to merge two reticle-limited GPUs into a single massive GPU, wherein the first and second circuits 110, 120, represent the components connected by the signaling link 130. More than two chips can be connected using a connector having multiple of the signaling link 130, such as a multi-chip module.

In addition to lossy channel 132, signaling link 130 includes a transmitter 134 and a receiver 136, which are connected together by lossy channel 132. Transmitter 134 sends data to be transmitted (i.e., transmission data denoted as txdata) from first circuit 110 to second circuit 120 using signaling link 130. Transmitter 134 includes a driver that sends the txdata over lossy channel 132 to receiver 136, which receives the transmitted data and provides the received data to the second circuit 120.

The transmitter 134 includes a driver and a passive equalizer, not shown in FIG. 1. Lossy channel 132 has a first end that is connected to the passive equalizer and a second end that is connected to a terminal of receiver 136, which is over-terminated. Lossy channel 132 has a channel characteristic impedance that is lower than terminating impedances of the passive equalizer at transmitter 134 and the over-terminated terminal of receiver 136. Signaling link 130 can be, for example, signaling link 200 of FIG. 2.

Figure 2:
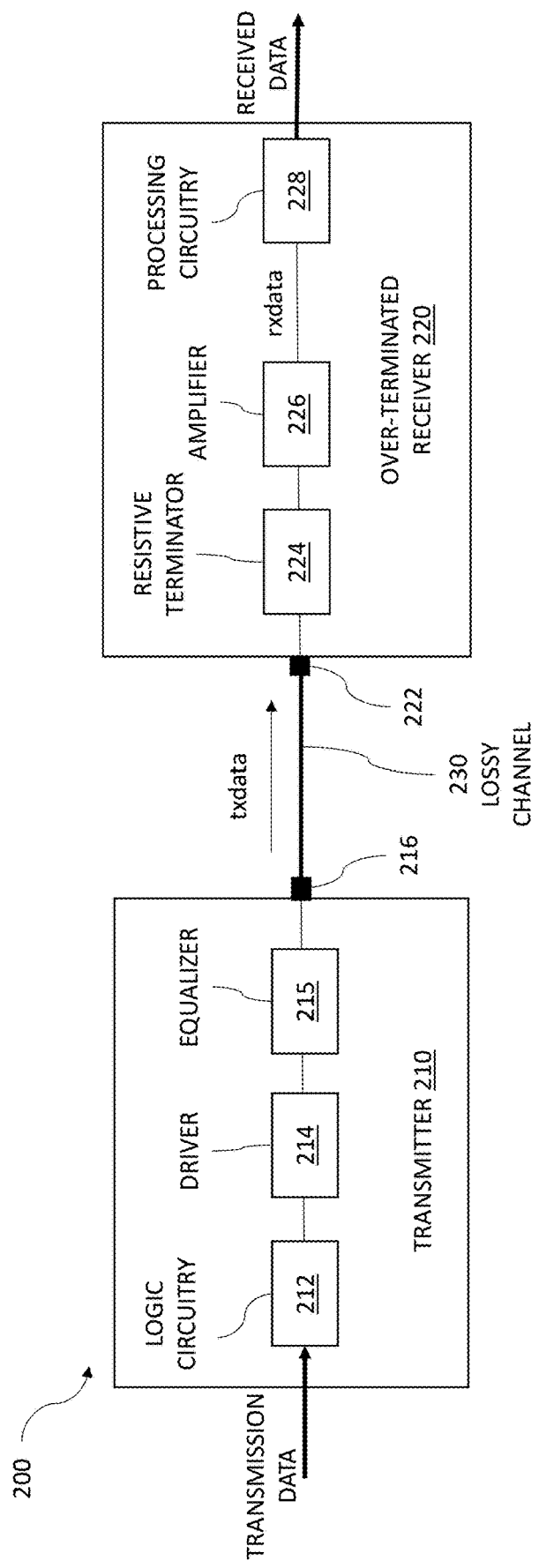
FIG. 2 illustrates a block diagram of an example of a signaling link constructed according to the principles of the disclosure.

FIG. 2 illustrates a block diagram of an example of a signaling link 200 constructed according to the principles of the disclosure. Signaling link 200 is configured to send data from one circuit to another circuit, such as from first circuit 110 to second circuit 120 of FIG. 1. Signaling link 200 includes a transmitter 210, an over-terminated receiver 220, and a lossy channel 230. The transmitter 210 and over-terminated receiver 220 can be constructed using CMOS devices. One or more of the capacitors used in the transmitter 210 and over-terminated receiver 220 can be metal-insulator-metal (MIM) or metal-oxide-metal (MOM) capacitors.

Transmitter 210 includes logic circuitry 212 that receives and processes the transmission data for transmission, and may include a data serializer that converts parallel transmission data to bit-serial form, one or more encoders to shape the frequency content of the transmitted data, and possibly other logical functions. The serial data from logic circuitry 212 is passed to driver 214, which converts the logical data from logic circuitry 212 into the voltage (or current) signal to be driven into the lossy channel 230. Passive equalizer 215 couples the driver 214 to the lossy channel 230 via terminal 216, and together with the lossy channel 230 and over-terminated receiver 220, flattens (equalizes) the overall frequency response of the signaling link 200, compensating for the parasitic distributed RC network of the lossy channel 230. Passive equalizer 215 may contain a simple parallel passive RC network, but may include other elements including T-coils, transformers, and more complex networks of resistors, capacitors, and inductors. Lossy channel 230 is physically connected to transmitter 210 at terminal 216 and is physically connected to over-terminated receiver 220 at terminal 222. The channel characteristic impedance of lossy channel 230 is lower than terminating impedances at terminal 216 and at terminal 222, which is an inherent RC impedance.

Receiver 220 also includes resistive terminator 224 connected to channel terminal 222 and amplifier 226. The resistive terminator 224 and the amplifier 226 can be collectively referred to as receiving circuitry or an input stage of the over-terminated receiver 220. Terminator 224 may comprise a simple resistor network or active circuitry that implements resistive termination and further equalization components that complement the passive equalizer 215. The received signal from terminal 222 passing through resistive terminator 224 passes into amplifier 226, which amplifies the small-swing attenuated signal from the lossy channel 230 at terminal 222 up to the voltage (current) levels required by receiving processing circuitry 228.

Figure 3:
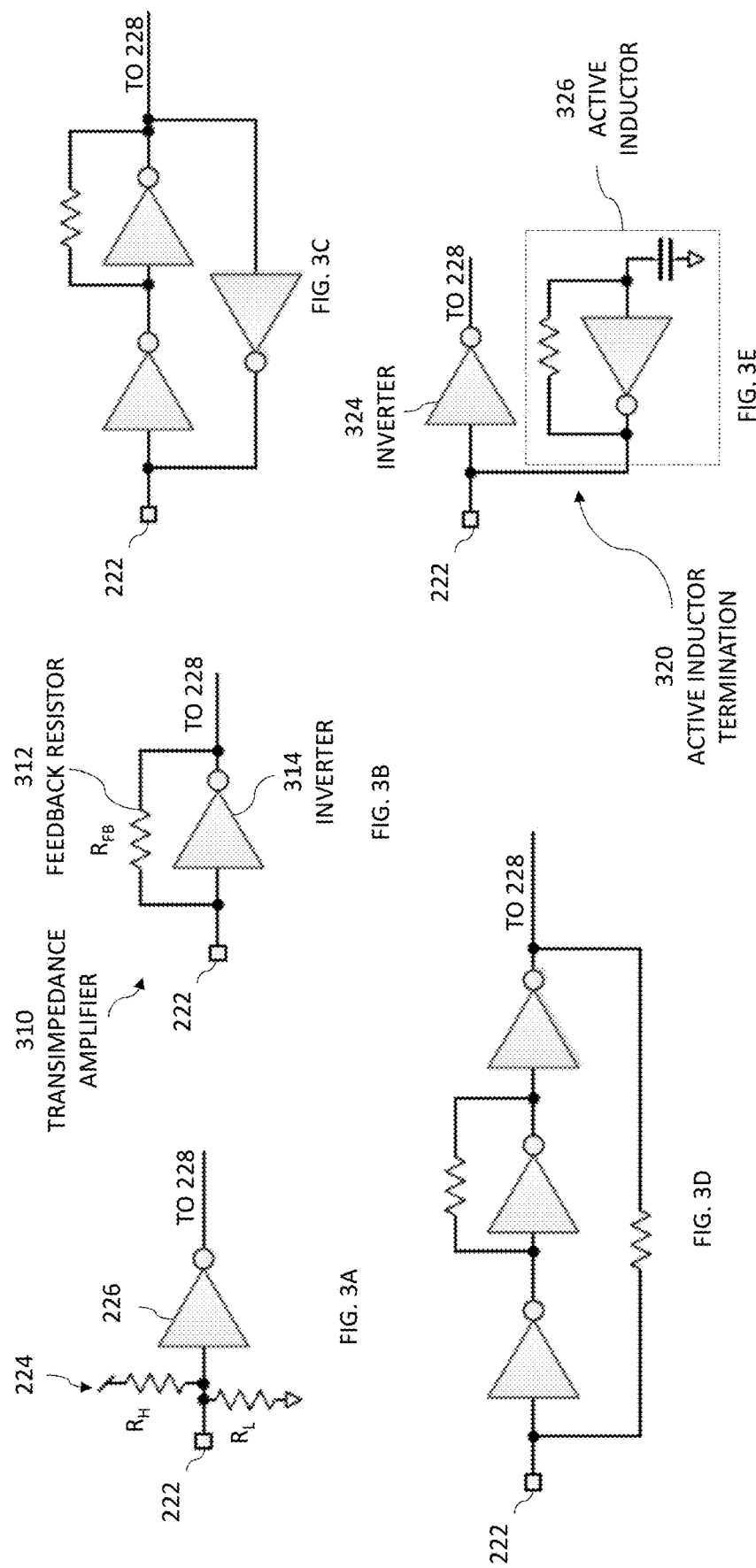

Various examples of a resistive termination and amplification circuits are provided in FIGS. 3A to 3E, which can be used for resistive terminator 224 and amplifier 226. In FIG. 3A resistive terminator 224 is implemented by the two resistors attached to the input terminal 222. These resistors form a network whose Thevenin equivalent is a single resistor with resistance equal to the parallel combination of the two physical resistors, such that the receiver termination resistance at terminal 222 is $R_R=R_H \cdot R_L/(R_H+R_L)$, returned to a termination voltage set by the voltage divider comprising the two resistors $V_{TERM}=Vdd*R_L/(R_L+R_H)$. In FIG. 3A, amplifier 226 is implemented in a single inverter. The termination voltage $V_{TERM}$ of the Thevenin terminator is set to bias this inverter into its high-gain region. Amplifier 226 can further be provided by one or more inverters and one or more feedback resistors connected in parallel with the inverters as shown in FIGS. 3B to 3D, and in these examples the functions of the resistive terminator 224 and amplifier 226 are combined into a single circuit. The simplest of these examples is the circuit of FIG. 3B, TIA 310, including an amplifying inverter 314 and feedback resistor $R_{FB}$ 312. The gain of this stage is always less than the open-loop gain of the inverter 314, but bandwidth is increased accordingly. The input impedance of the TIA 310 implements the termination resistance of resistor terminator 224 with resistance $R_R=R_{FB}/(1+Gain)$, where Gain is the closed-loop gain of TIA 310. The TIA 310 can include extremely-low threshold voltage (ELVT) components. Additionally, the PVT variation for the FETs that make up the gain stage can be addressed by varying the effective number of fingers in the amplifier.

Feedback resistor 312 can be an adjustable resistor that uses switches (e.g., CMOS pass gates) to adjust the overall resistance for a design. The feedback resistor 312 can be multiple resistors connected in parallel that includes a fixed resistor and one or more adjustable resistors. The switches for the adjustable resistors can be at the output end of the resistor for electrostatic discharge (ESD) protection reasons. The gates of the devices of the TIA 310 can also be isolated from the channel 230 with a secondary ESD shunt (not shown) for ESD protection. Additional ESD protection can be provided by some segments of the TIA 310 being devoted solely to generating the correct termination impedance but providing no gain.

FIGS. 3C and 3D illustrate Cherry-Hooper amplifiers, with feedback in two different forms to provide approximately resistive input impedance at terminal 222. FIG. 3E illustrates an active inductor termination 320, that includes active inductor circuit 326 that implements the termination resistance of resistive terminator 224, and an inverter 324 for amplifier 226. The arrangement of FIG. 3E implements a termination whose resistance increases with frequency, thereby comprising a second receiver equalizer that may be helpful in certain cases.

In FIG. 2 receiver 220 further includes processing circuitry 228 that receives the data (i.e., received data represented by rxdata) and further processes the data before delivery to the desired destination, such as second circuit 120. This processing may include, but is not limited to, deserialization and decoding of txdata received by over-terminated receiver 220.

The signaling link 200 can be a DC coupled link or an AC coupled link. For example, signaling link 200 can be used for ISR signaling. For a DC coupled link, passive equalizer 215 can include an equalizing capacitor and equalizing resistor coupled in parallel. For an AC coupled link, passive equalizer 215 may include an equalizing capacitor and the equalizing resistor can be moved to receiver 220 as part of the receiving circuitry, such as part of resistive terminator 224 and amplifier 226. FIGS. 4 and 5 represent examples of a DC link and an AC link, respectively.

FIG. 4 illustrates a schematic diagram of an example of a DC coupled signaling link 400 constructed according to the principles of the disclosure. The signaling link 400 includes transmitter 410, over-terminated receiver 420, and lossy channel 430.

Transmitter 410 accepts serial data txdat from logic circuitry 411 that is input to driver 412, which drives the channel signal into lossy channel 430 through passive equalizer 415 and terminal 419. Driver 412 is a low-impedance driver with output resistance $R_D$, typically much smaller than equalizing resistor $R_E$ 417. For example, in a typical short-reach link over silicon interposer wiring, $R_E$ can be 1000 ohms while the driver resistance $R_D$ can be 10-15 ohms. The driver 412 can have an adjustable output stage wherein the P/N ratio is adjustable. An adjustable inverter can be used to drive a single fixed resistor that is shunted by a fixed capacitor, such as the parallel combination of resistor $R_E$ 417 and capacitor $C_E$ 416 of passive equalizer 415. Transmitter 410 also includes unavoidable parasitic capacitance, represented by $C_S$ 418, which becomes part of the transmission channel, lossy channel 430. Receiver 420 similarly includes parasitic capacitance, represented by $C_R$ 429. Capacitances 418 and 429 are unwanted, but inevitably arise from connection pads and balls, vertical on-chip and off-chip metal structures that connect on-chip circuitry to external signal conductors, and ESD protection devices located on-chip. Signals from transmitter 410 pass from terminal 419 (tx) to terminal 421 (rx) over lossy channel 430, represented by a signal wire and characterized by series resistance $R_W$ and capacitance $C_W$ in FIG. 4.

Receiver 420 receives transmitted data from lossy channel 430 on terminal 421 (rx). Receiving circuitry 423 of over-terminated receiver 420 includes a transimpedance amplifier (such as illustrated in FIG. 3B), which includes first inverter 425 and feedback resistor 424 ($R_{FB}$), and second inverter 427. As explained in connection with FIG. 3B, the transimpedance amplifier structure presents input resistance $R_R=R_{FB}/(1+\text{Gain})$ to the receiver terminal 421, thereby resistively terminating the lossy channel 430. Amplification of the received transmitted data is performed by the first inverter 425, which is part of transimpedance amplifier, and second inverter 427, and collectively referred to as receiving amplifier 422. These two stages of amplification provide the necessary gain such that signal rxdat is a rail-to-rail CMOS signal suitable to pass to processing circuitry 428, which can be logic circuitry for deserialization and decoding.

As noted above, a value for the equalizing capacitor 416 can be calculated using Equation 1 below that can be used with RC-dominated transmission lines, such as lossy channel 430.

$$C_E = \frac{R_W C_W + 2R_W C_S + 2R_R(C_W + C_S + C_R)}{2R_S} + \frac{R_W^2 C_W + 3R_W R_R C_W + 6R_W R_R C_R}{6R_S^2} + \frac{R_D\left[R_W\left(\frac{C_W}{2} + C_S\right) + R_R(C_W + C_S + C_R)\right]}{R_S^2}. \quad \text{Equation 1}$$

In Equation 1, Rw and Cw are the resistance and capacitance of lossy channel 430 with Rw=Lr and Cw=Lc wherein L is the length of the lossy channel 430 between terminals 419 and 421, and r and c are the resistance and capacitance per unit length of the channel conductor. In a typical design process, the DC attenuation is specified, and $R_E$ is determined based on the channel resistance $R_W$ and receiver termination resistance $R_R$. Higher attenuation values lead to lower overall link power and improved equalization, but the signal input to the receiver 420 must be large enough to overcome systematic and random noise at the receiver input. For example, in deep submicron processes a typical TIA inverter may have input referred thermal noise of about 1 mV or less, requiring an input signal amplitude, after all systematic noises source are accounted for, of about 10 mV in order to provide bit-error rates sufficiently low to avoid the necessity of error correction.

The first term of Equation 1 is typically the dominant term and is the value of $C_E$ that, on each signal transition, charges the channel capacitances $C_S$, $C_W$, and $C_R$ to their DC-attenuated values. The second term in Equation 1 is a correction for the distribution of charge of $C_W$ due to the channel resistance $R_W$. The third term in Equation 1 is a correction due to the finite driver resistance $R_D$. In most ISR applications, the $2^{nd}$ and $3^{rd}$ terms will be a few percent of the first term.

FIG. 5 illustrates a schematic of an example of an AC coupled signaling link 500 constructed according to the principles of the disclosure. With the DC coupled signaling link 400, the power supply of the transmitter 410 is, effectively, the reference voltage for the signaling link 400, which allows receiving inverters to split the supply at roughly 0.5×Vdd to establish the reference. This method can work well when both ends of a signaling link operate at the same supply voltage, such as by ensuring that the supply rails at the two ends of a link are robustly interconnected to avoid differential supply noise.

The disclosure advantageously recognizes, however, the benefit of having different supply voltages at the transmitting and receiving ends of a signaling link (e.g., memory interconnect, where DRAM supply voltages are significantly higher than CMOS logic supplies), or to operate a link in which the two ends may be implemented in different semiconductor technologies. An AC-coupled link is one way to handle these situations. FIG. 5 shows a transformation from single-supply DC-coupled signaling link 400 to an AC-coupled version, signaling link 500, in which fairly large difference in supply voltages can be tolerated between the link ends. For example, the signaling link 500 can be used for communicating between chips fabricated on different process nodes or chips operating on different supply voltages (e.g., processor-to-DRAM communication).

Signaling link 500 also transmits data and includes similar components with signaling link 400 as indicated by the same or similar element numbers. For example, signaling link 500 includes a transmitter 510, over-terminated receiver 520, and lossy channel 530. The transmitter 510 includes logic circuitry 411, driver 512, and passive equalizer 515. The receiver 520 includes receiving circuitry 523 and processing circuitry 428. Transmitter 510 also includes unavoidable parasitic capacitance, represented by $C_S$ 518, which becomes part of the transmission channel, lossy channel 530. Receiver 520 similarly includes parasitic capacitance, represented by $C_R$ 529. Lossy channel 530 is physically connected to transmitter 510 at terminal 519 and is physically connected to over-terminated receiver 520 at terminal 521.

Though similar or same components that perform the same function of transmitting data, values for each of the components may be different for the DC version of FIG. 4 compared to the AC version of FIG. 5. Additionally, passive equalizer 515 and receiving circuitry 523 of signaling link 500 differ from passive equalizer 415 and receiving circuitry 423 of signaling link 400 as illustrated and noted below. For example, receiving circuitry 523 of over-terminated receiver 520 includes a transimpedance amplifier, which includes first inverter 525 and feedback resistor 524 ($R_{FB}$), second invertor 527, and overall feedback resistor 528. Amplification of the received transmitted data in signaling link 500 is performed by the first inverter 525, which is part of the transimpedance amplifier, and second inverter 527, and collectively referred to as receiving amplifier 522.

In the AC-coupled version represented in FIG. 5, the DC levels on lossy channel 530 are established by receiver 520, and the series resistance of the lossy channel 530 is eliminated from the final amplitudes. Specifically, the input resistance of transimpedance amplifier is, as before, determined by the closed-loop gain of inverter 525 and feedback resistor 524 such that $R_R=R_{FB}/(1+\text{Gain})$ as in signaling link 400. In signaling link 500, however, the attenuated signal levels at receiver terminal 521 are determined by the overall feedback resistor 528, $R_S$. Essentially the equalizing resistor of signaling link 400 has been moved from the transmitter passive equalizer to the receiver, forming a latch with two stable states corresponding to receiving a HI or a LO from transmitter 510. The signal swing at the receiver terminal 521 is therefore $V_{RX} \cdot R_R/(R_R+R_S)$, where $V_{RX}$ is the power supply voltage at the receiver 520, which we will now assume differs from the supply voltage $V_{TX}$ at transmitter 510. Accordingly, the value $C_E$ for equalizing capacitor 516 differs from the value of equalizing capacitor 416 of signaling link 400. Additionally, passive equalizer 515 does not include an equalizing resistor, as that function has migrated to overall feedback resistor 528. The value for the equalizing capacitor 516 can be shown to be approximately given by Equation 2:

$$C_E = \frac{R_R(C_S + C_W + C_R)}{\frac{V_{TX}}{V_{RX}}(R_R + R_S) - R_R}$$

Note that if $V_{TX}=V_{RX}$ and $R_W=0$, this reverts to the first term in Equation 1. Since no DC flows through the channel wire, there is no voltage drop across the channel resistance, thus the difference in form.

As noted above, the receiver 520 essentially forms a latch, such as a CMOS jam latch, whose loop gain is set by the feedback resistors. Upon startup, this latch will fall into one of its two stable states HI or LO. If the first transition driven onto the channel 530 is toward the opposite state, the signaling link 500 should start correctly, but if toward the same state, it may take several transitions to charge the channel capacitances to their normal operational values. As such, a means can be used to assure both ends of the signaling link 500 start in the same state (e.g., a "reset" to initialize the receiver latch), or a warmup sequence of bits can be transmitted before using the signaling link 500 for live data.

The disclosure provides a signaling link that improves bandwidth and energy efficiency compared to conventional interposer signaling systems that have high-loss signal wires (minimum width) interspersed with maximum-width shields to reduce crosstalk. The signaling link advantageously transmits over a lossy channel, utilizing intentional DC attenuation and AC equalization to improve bandwidth, and can readily be implemented using CMOS inverter-based circuitry. The signaling link can be used for HBM systems, chip-to-chip signaling applications, on-chip signaling applications, or other signaling systems in which the communication channel is lossy or RC-dominated.

The signaling link can be used in circuits of digital data processors or computers having one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Configured or configured to means, for example, designed, constructed, or programmed, with the necessary logic and/or features for performing a task or tasks.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the Summary may have one or more of the additional features of the dependent claims in combination. It is noted that as used herein and in the appended claims, the singular forms "a", "an", and "the" include plural referents unless the context clearly dictates otherwise.

What is claimed is:

1. A signaling link, comprising:
   a transmitter including a passive equalizer;
   an over-terminated receiver; and
   a lossy channel having a first end connected to the passive equalizer and a second end connected to the receiver, wherein the lossy channel has a channel characteristic impedance that is lower than a terminating impedance of the passive equalizer and a termination impedance of the receiver.

2. The signaling link as recited in claim 1, wherein the lossy channel is an RC dominated communications channel having an attenuation of about 3 dB or greater at Nyquist frequency.

3. The signaling link as recited in claim 1, wherein the lossy channel is an RC dominated communications channel having an attenuation that reduces reflections on the channel to a negligible signal voltage.

4. The signaling link as recited in claim 1, wherein the over-terminated receiver includes receiving circuitry having an amplifier connected to a resistive terminator.

5. The signaling link as recited in claim 4, wherein the receiving circuitry further includes at least one overall feedback resistor connected in parallel with the resistive terminator and the amplifier.

6. The signaling link as recited in claim 4, wherein the resistive terminator is a resistive Thevenin termination.

7. The signaling link as recited in claim 4, wherein the resistive terminator is a Cherry-Hooper amplifier.

8. The signaling link as recited in claim 4, wherein the resistive terminator is a transimpedance amplifier (TIA).

9. The signaling link as recited in claim 1, wherein the passive equalizer includes one or more equalizing capacitors.

10. The signaling link as recited in claim 9, wherein the passive equalizer further includes one or more equalizing resistors coupled in parallel with the one or more equalizing capacitors.

11. The signaling link as recited in claim 1, wherein the signaling link is a short reach link.

12. An electrical system, comprising:
a signaling link;
a first circuit connected to a first end of the signaling link; and
a second circuit connected to a second end of the signaling link, wherein the signaling link includes:
a transmitter having a passive equalizer network;
an over-terminated receiver; and
a lossy channel having a first end connected to the passive equalizer network and a second end connected to the receiver, wherein the lossy channel has a channel characteristic impedance that is lower than terminating impedances of the passive equalizer network and the receiver.

13. The system as recited in claim 12, wherein the first circuit is a processor and the second circuit is a memory.

14. The system as recited in claim 12, wherein the first circuit is a processor and the second circuit is a different processor.

15. The system as recited in claim 12, wherein the first circuit and the second circuit are located on a single chip.

16. The system as recited in claim 15, wherein the lossy channel is constructed of a metal that is not copper.

17. The system as recited in claim 12, further comprising an interposer that includes more than one of the signaling link, wherein the first circuit is a first chip, the second circuit is a second chip, and the interposer connects the first chip to the second chip.

18. A multi-chip module, comprising:
multiple chips; and
a connector that couples one or more of the multiple chips to at least a different one of the one or more of the multiple chips, wherein the connector includes one or more signaling links and at least one of the one or more signaling links includes:
a transmitter having a passive equalizer;
an over-terminated receiver; and
a lossy channel having a first end connected to the passive equalizer and a second end connected to the receiver, wherein the lossy channel has a channel characteristic impedance that is lower than terminating impedances of the passive equalizer and the receiver.

19. The multi-chip module as recited in claim 18, wherein the connector is an interposer.

20. The multi-chip module as recited in claim 19, wherein the lossy channel has a length within a range of 1 to 10 millimeters.

21. A high bandwidth memory system, comprising:
one or more memories;
one or more circuits; and
a connector that connects at least one of the one or more memories to at least one of the one or more circuits, wherein the connector includes at least one signaling link that includes:
a transmitter including a passive equalizer;
an over-terminated receiver; and
a lossy channel having a first end connected to the passive equalizer and a second end connected to the receiver, wherein the lossy channel has a channel characteristic impedance that is lower than a terminating impedance of the passive equalizer and a termination impedance of the receiver.

22. The high bandwidth memory system as recited in claim 21, wherein the connector is an interposer.

23. An AC signaling link, comprising:
a transmitter including one or more equalizing capacitors;
an over-terminated receiver having an amplifier connected to a resistive terminator and at least one overall feedback resistor connected in parallel with the resistive terminator and the amplifier; and
a lossy channel having a first end connected to the one or more equalizing capacitors and a second end connected to the receiver, wherein the lossy channel has a channel characteristic impedance that is lower than a terminating impedance of the one or more equalizing capacitors and a termination impedance of the receiver.

24. The AC signaling link as recited in claim 23, wherein the resistive terminator is a transimpedance amplifier (TIA).

* * * * *